(12) United States Patent
Stammers et al.

(10) Patent No.: US 10,268,474 B2
(45) Date of Patent: Apr. 23, 2019

(54) NETWORK SLICE SELECTION IN A MOBILE NETWORK

(71) Applicant: Cisco Technology, Inc., San Jose, CA (US)

(72) Inventors: Timothy P. Stammers, Raleigh, NC (US); Michael D. Geller, Weston, FL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/652,246

(22) Filed: Jul. 18, 2017

(65) Prior Publication Data

US 2019/0026094 A1 Jan. 24, 2019

(51) Int. Cl.
*G06F 8/65* (2018.01)
*H04W 48/18* (2009.01)
*H04L 12/24* (2006.01)
*H04W 24/02* (2009.01)
*H04W 4/80* (2018.01)
*H04L 29/06* (2006.01)

(52) U.S. Cl.
CPC ............... *G06F 8/65* (2013.01); *H04L 41/14* (2013.01); *H04W 4/80* (2018.02); *H04W 24/02* (2013.01); *H04W 48/18* (2013.01); *H04L 63/20* (2013.01)

(58) Field of Classification Search
None
See application file for complete search history.

(56) References Cited

U.S. PATENT DOCUMENTS

| 2013/0339495 | A1* | 12/2013 | Mower | H04L 41/0803 |
| | | | | 709/220 |
| 2015/0358399 | A1* | 12/2015 | Baugher | H04L 67/1002 |
| | | | | 709/203 |
| 2016/0315947 | A1* | 10/2016 | Boss | H04L 63/20 |
| 2016/0350531 | A1 | 12/2016 | Harris et al. | |
| 2017/0141973 | A1* | 5/2017 | Vrzic | H04W 24/08 |
| 2017/0164187 | A1 | 6/2017 | Lu | |

(Continued)

FOREIGN PATENT DOCUMENTS

| EP | 3166281 A1 | 5/2017 | |
| EP | 3185607 A1 * | 6/2017 | ......... H04L 41/0813 |
| WO | 2017011827 | 1/2017 | |

OTHER PUBLICATIONS

5GAmericas, "Network Slicing for 5G Networks & Services", Nov. 2016, published at http://www.5gamericas.org/files/3214/7975/0104/5G_Americas_Network_Slicing_11.21_Final.pdf.*

(Continued)

*Primary Examiner* — Hossain M Morshed

(57) ABSTRACT

In one embodiment, a system includes an interface to receive a device identifier which uniquely identifies a first device, a processor to determine at least one characteristic of the first device from the device identifier, and select a first network slice based on the at least one characteristic of the first device, the first network slice including a first plurality of security services countering security risks associated with the at least one characteristic of the first device, wherein the interface is operative to send slice identifier information about the first network slice towards the first device. Related apparatus and methods are also described.

20 Claims, 3 Drawing Sheets

(56) References Cited

U.S. PATENT DOCUMENTS

2017/0164212 A1* 6/2017 Opsenica .............. H04W 12/06

OTHER PUBLICATIONS

Schneider, "5G Security Research at Nokia Bell Labs", Nov. 2016, published at https://www.sics.se/sites/default/files/pub/sics.se/SecurityDay16/peter_schneider.pdf.*

Nokia, Security Challenges and Opportunities for 5G Mobile Networks—White Paper Feb. 2017.

Sama, Malla Reddy et al.; Service-Based Slice Selection Function for 5G; 2016 IEEE Global Communications Conference (GLOBECOM), Washington, DC, 2016, pp. 1-6. doi: 10.1109/GLOCOM.2016.7842265.

International Search Report and Written Opinion in counterpart International Application No. PCT/US2018/041548, dated Sep. 13, 2018, 19 pages.

SA WG2 Temporary Document, "Solution: PDU Sessions served by different Network Slices", S2-161574, revision of S2-16xxxx, SA WG2 Meeting #114, Apr. 11-15, 2016, Sophia Antipolis, France, XP 051086558, http://www.3gpp.org/ftp/tsg_sa/WG2_Arch/TSGS2_114_Sophia_Antipolis/Docs/, 4 pages.

Ericsson, Tdoc R3-172509, "Assistance Information for network slice selection in RRC", 3GPP TSG-RAN WG3 AH #2, Qingdao, P.R. China, Jun. 27-29, 2017, XP051302449, http://www.3gpp.org/ftp/Meetings_3GPP_SYNC/RAN3/Docs/, 4 pages.

"3rd Generation Partnership Project; Technical Specification Group Services and System Aspects; Study on the security aspects of the next generation system", Release 14, 3GPP TR 33.899, V0.6.1, Feb. 2017, Technical Report, XP051228955, http:www.3gpp.org/ftp/tsg_sa/WG3_Security/TSGS3_86_Sophia/Docs, pp. 1-100.

"3rd Generation Partnership Project; Technical Specification Group Services and System Aspects; Study on the security aspects of the next generation system", Release 14, 3GPP TR 33.899, V0.6.1, Feb. 2017, Technical Report, XP051228955, http:www.3gpp.org/ftp/tsg_sa/WG3_Security/TSGS3_86_Sophia/Docs, pp. 101-200.

"3rd Generation Partnership Project; Technical Specification Group Services and System Aspects; Study on the security aspects of the next generation system", Release 14, 3GPP TR 33.899, V0.6.1, Feb. 2017, Technical Report, XP051228955, http:www.3gpp.org/ftp/tsg_sa/WG3_Security/TSGS3_86_Sophia/Docs, pp. 201-300.

"3rd Generation Partnership Project; Technical Specification Group Services and System Aspects; Study on the security aspects of the next generation system", Release 14, 3GPP TR 33.899, V0.6.1, Feb. 2017, Technical Report, XP051228955, http:www.3gpp.org/ftp/tsg_sa/WG3_Security/TSGS3_86_Sophia/Docs, pp. 301-381.

Alan Carlton, "What is the difference between network slicing and Quality of Service?", https://www.computerworld.com/article/3231244/mobile-wireless/what-is-the-difference-between-network-slicing-and-quality-of-service.html, downloaded from the internet on Aug. 31, 2018, 7 pages.

* cited by examiner

NETWORK SLICE SELECTION IN A MOBILE NETWORK

TECHNICAL FIELD

The present disclosure generally relates to network slice selection in a mobile network based on at least one characteristic of a device.

BACKGROUND

A network slice may be defined as a set of services that provide a particular desired utility in a mobile or wireless network. The services in a network slice may be applied in a user plane, a control plane, and a management plane. Each plane carries a different type of traffic. The user plane, (sometimes known as the data plane, forwarding plane, carrier plane or bearer plane) carries the network user traffic. Services applied in the user plane are generally functional in the packet-processing path in the network. The control plane carries signaling traffic. The management plane, which carries administrative traffic, is considered a subset of the control plane. Network slice selection is generally performed based on subscription data associated with a user of a device and a data service being requested.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present disclosure, a system including an interface to receive a device identifier which uniquely identifies a first device, a processor to determine at least one characteristic of the first device from the device identifier, and select a first network slice based on the at least one characteristic of the first device, the first network slice including a first plurality of security services countering security risks associated with the at least one characteristic of the first device, wherein the interface is operative to send slice identifier information about the first network slice towards the first device.

DETAILED DESCRIPTION

Figure 1:
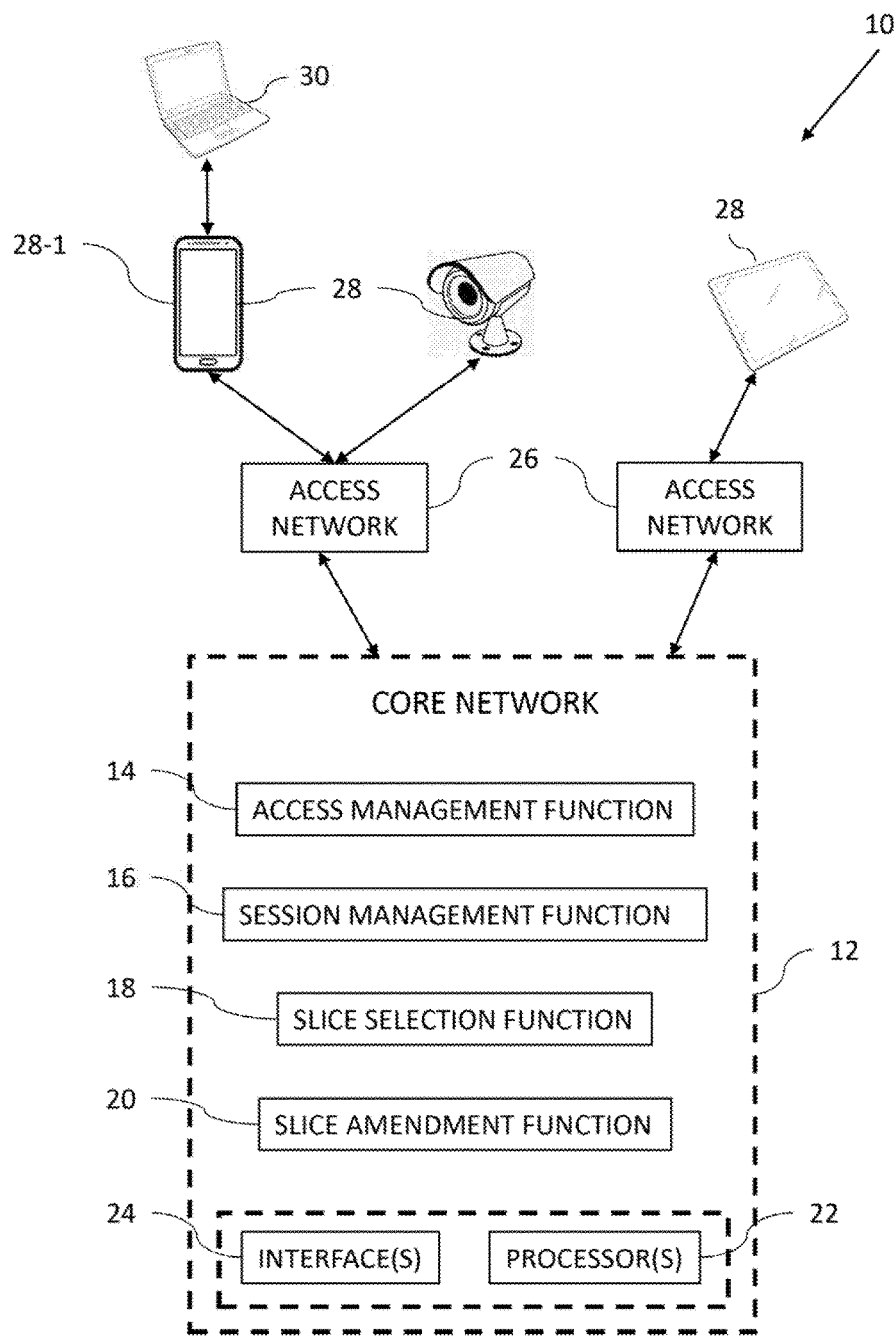
FIG. 1 is a partly pictorial, partly block diagram view of a wireless communication system constructed and operative in accordance with an embodiment of the present disclosure.

Reference is now made to FIG. 1, which is a partly pictorial, partly block diagram view of a wireless communication system 10 constructed and operative in accordance with an embodiment of the present disclosure. The wireless communication system 10 includes a core network 12 and one or more access networks 26 (for example, but not limited to, radio access networks). The core network 12 includes an access management function 14, a session management function 16, a slice selection function 18, and a slice amendment function 20. The core network 12 shows one of each of the functions 14, 16, 18, 20. It will be appreciated that any of the functions 14, 16, 18, 20 may have multiple instances in the core network 12. The functions 14, 16, 18, 20 may run on one or more processors 22 included in the core network 12. One or more interfaces 24 included in the core network 12 may be operative to transfer data between the functions 14, 16, 18, 20 within the core network 12, and to transfer data between the functions 14, 16, 18, 20 and elements, such as the access networks 26, outside the core network 12.

The access networks 26 are operationally connected to the core network 12 and to a plurality of devices 28, for example, but not limited to, sensors, actuators, endpoint devices, and/or user equipment (such as mobile phones, tablets, and/or laptop computers). The devices 28 may be mobile, nomadic, or fixed devices. The devices 28 may optionally be tethered by a cable or wirelessly connected to other devices 30 (only one shown in FIG. 1), for example, but not limited to, laptop computers or tablets.

By way of introduction, network-based security resources include a multitude of techniques. Not all of the techniques are applicable for all network connections and there may be insufficient network-based security resources to apply all of the techniques for all network connections. Therefore, the wireless communication system 10 is operative to provide security protection against various security risks by careful network slice selection. Prior to establishing a session for one of the devices 28 (a device 28-1), the slice selection function 18 is operative to select one or more network slices for the device 28-1 with the network slice(s) including security services to counter security risks associated with one or more characteristics of the device 28-1. There is typically one slice selected for a given session associated with a specific data service. If the device 28-1 requests multiple data services, each data service for a unique session, then a network slice could be chosen by the slice selection function 18 to service each data service. The characteristic(s) of the device are typically determined based on a unique device identifier (e.g., International Mobile Equipment Identity (IMEI)) associated with the device 28-1. The security services may be applied in the user plane. Some security services are based on analysis by a security-oriented function based on data provided by the user plane. The selected slice(s) typically also include other services applied in the user plane and the control plane.

The network slice selection may be modified during a session to better address potential security threats or risks (and even redundant security risks) as device behavior is learnt over time, for example, by applying flow-based analysis to data flowing to, or flowing from, the device 28-1. A further trigger for modification of the network slice selection could be recognition of one or more devices 30 using the device 28-1, for example, but not limited to, based on tethering detection, or based on use of a wireless hotspot in the device 28-1.

Session set up is now described in more detail with an example according to the $5^{th}$ generation (5G) wireless systems standard. It will be appreciated that slice selection of the present disclosure may also be implemented according to other telecommunication standards with suitable changes. The device 28-1 sends a registration request to one of the access networks 26. The registration request may include a Subscriber Permanent Identification (ID), a Selected Network, and Network Slice Selection Assistance Information (NSSAI), by way of example only. The selected access network 26 selects one of the access management functions 14 and sends a registration request to the selected access management function 14. The registration request generated by the selected access network 26 may include the Subscriber Permanent ID, the Selected Network, and Network Slice Selection Assistance Information (NSSAI), by way of example only. The selected access management function 14 selects an Authentication Server Function (AUSF), authenticates a user of the device 28-1, selects a Unified Data Management (UDM) function (not shown), and updates a location of the device 28-1. The UDM typically returns subscription related information and potentially a list of permitted NSSAI to the access management function 14. The access management function 14 may also perform an interaction with a policy control function (not shown) that applied access-specific policies. The selected access management function 14 sends a slice selection request message to the slice selection function 18. The slice selection request message typically includes the Subscriber Permanent ID, the Network Slice Selection Assistance Information (NSSAI), a device identifier, and a requested data service in the form of a Data Network Name (DNN), by way of example only. The device identifier may be the International Mobile Equipment Identity (IMEI) of the device 28-1.

Figure 2:
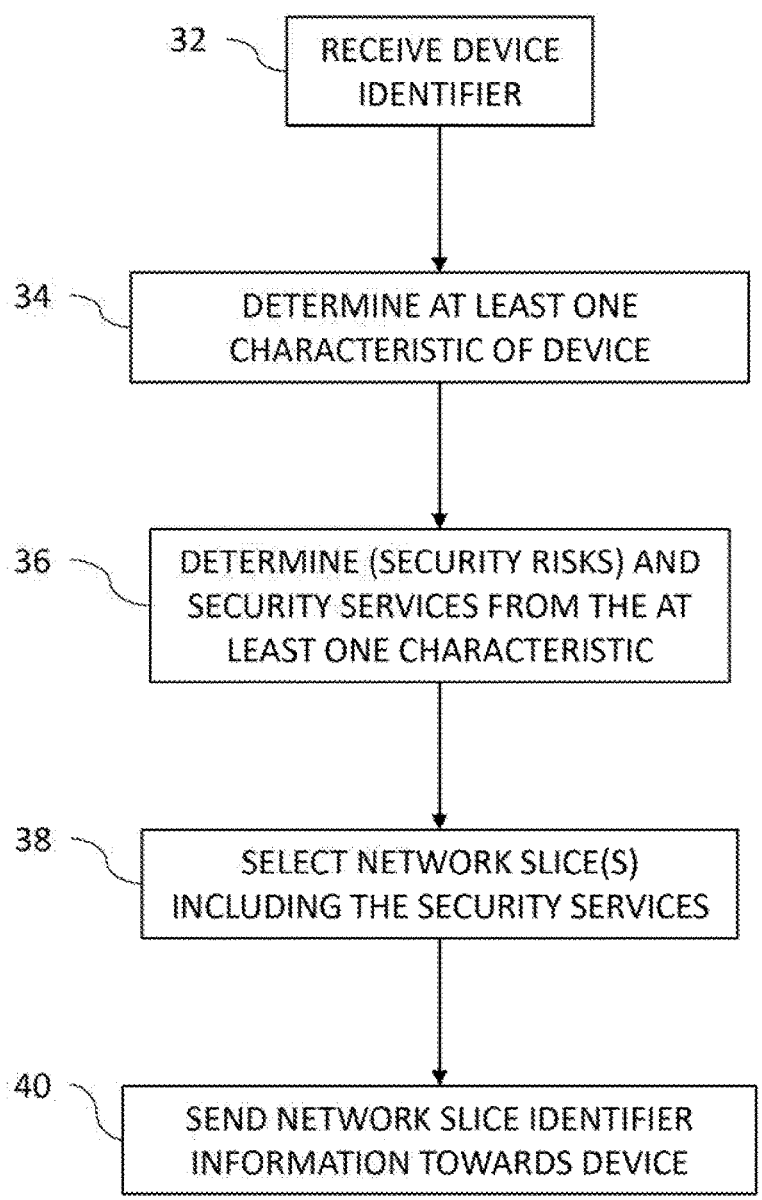
FIG. 2 is a flow chart showing exemplary steps in a method to select a network slice or slices in the system of FIG. 1.

Reference is now made to FIG. 2, which is a flow chart showing exemplary steps in a method to select a network slice or slices in the system of FIG. 1. Reference is also made to FIG. 1. One of the interfaces 24, hereinafter referred to as the interface 24, receives (block 32) the device identifier along with the other data in the slice request selection request. The device identifier uniquely identifies the device 28-1.

It will be appreciated that the slice selection steps described below are performed by the slice selection function 18 running on one of the processors 22, hereinafter referred to the processor 22. The processor 22 is operative to determine (block 34) at least one characteristic of the device 28-1 from the device identifier. The processor 22 is operative to determine the characteristic(s) of the device 28-1 from the device identifier by looking up the device identifier in a database of device identifiers and corresponding characteristics of each device identifier. Alternatively, the processor 22 may send a lookup request to a service, which looks up the device identifier in the database and returns the characteristic(s) of the device 28-1 to the processor 22. The Global System for Mobile Communications Association (GSMA) TS.30 IMEI Database application form may be used to provide characteristics based on IMEI, by way of example only.

The characteristic(s) of the device 28-1 may include any of the following, by way of example only: a make of the device 28-1; a model identifier of the device 28-1; a marketing name of the device 28-1; an operating system installed on the device 28-1; a platform of the device 28-1; a version of the operating system and/or the platform of the device 28-1; a software upgrade installed on the device 28-1; whether wireless local area network connectivity is supported by the device 28-1; which frequency band or bands are supported by the device 28-1; whether Bluetooth wireless technology is supported by the device 28-1; whether dual connectivity is supported by the device 28-1; and/or whether inter carrier aggregation is supported by the device 28-1.

It will be appreciated that the characteristic(s) of the device 28-1 may be indicative of one or more security risks, which in turn may be countered by one or more security services. The processor 22 is operative to determine (block 36) a plurality of security services based on the characteristic(s). The wireless communication system 10 may include, or have access to (e.g., via a lookup service), one or more databases linking device characteristics with security services.

In accordance with an alternative embodiment, the processor 22 is operative to determine one or more security risks based on the characteristic(s) of the device 28-1 and then to determine the plurality of security services based on the one or more security risks associated with the characteristic(s) of the device 28-1. In accordance with this alternative embodiment, the wireless communication system 10 may include, or have access to (e.g., via a lookup service or services), a database linking device characteristics with security risks, and a database linking security risks with security services.

The following are some examples of how device characteristics may be linked with security risk and services. If the device operating system is B version X (known to be malware-susceptible) then security services may be selected to include advanced malware detection, prevention, and mediation. If the device operating system is C and has wireless connectivity (WIFI) capability then security services may be selected to include flow reporting, baseline and anomalous behavior detection with mobile-policy enabled event actions, and device fingerprinting. If access point name (APN) or DNN indicates connected car Internet of Things (IoT) service and device type supports WIFI, then security services may be selected to include intrusion detection system (IDS) and/or intrusion prevention system (IPS), flow reporting, baseline and anomalous behavior assessment, and domain-based threat detection. If APN/DNN indicates minimal capability device IoT service and device type indicates no external connectivity, and a very simple platform (the level of simplicity being determined by the system administrator for example), then the security services selected may include domain-based threat detection.

The processor 22 is operative to select (block 38) a network slice(s) based on the characteristic(s) of the device 28-1. The selected network slice(s) includes the security services countering security risks associated with the characteristic(s) of the device 28-1. In accordance with an embodiment of the present disclosure, the processor 22 is operative to select the network slice(s) based on the security services being included in the network slice(s). In accordance with an alternative embodiment of the present disclosure, the processor 22 is operative to select the network slice(s) based on a direct mapping between device characteristics and available network slices.

It will be appreciated that network slice selection may also be based on other factors apart from the characteristic(s) of the device 28-1. Other security and non-security services may be determined by the slice selection function 18 for being applied in the user plane and/or the control plane for the upcoming session of the device 28-1.

The interface 24 is operative to send (block 40) network slice identifier information about the selected network slice(s) towards the device 28-1, for example via the access management function 14 that sent the registration request and possibly via one or more of the other interfaces 24. The network slice identifier information may be sent in a list of allowed Network Slice Selection Assistance Information (NSSAI). The network slice identifier information about the selected network slice(s) is received by the device 28-1.

The following paragraph briefly describes session establishment according to the 5G wireless systems standard. The device 28-1 selects one of the network slices from the list of allowed network slices and sends a protocol data unit (PDU) Session Establishment request to one of the access management functions 14. The PDU Session Establishment request may include PDU session IDs and information about the selected network slice (S-NSSAI). A Session Management (SM) Request including the PDU Session Establishment Request is sent by that access management function 14 to one of the session management functions 16. That session management function 16 generally selects the user plane functions in accordance with the S-NSSAI. If subslice selection is used then there may be multiple subslices corresponding to the different security function of the selected slice. That session management function 16 sends an SM response to that access management function 14.

Figure 3:
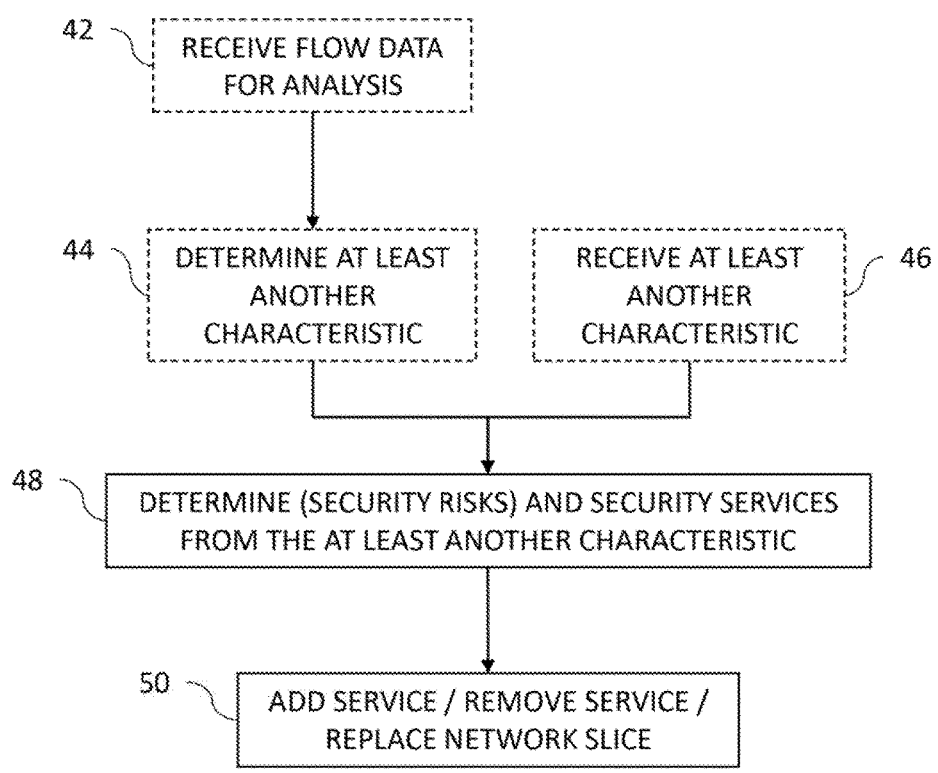
FIG. 3 is a flow chart showing exemplary steps in a method to amend or replace a selected network slice in the system of FIG. 1.

Reference is now made to FIG. 3, which is a flow chart showing exemplary steps in a method to amend or replace a selected network slice in the system 10 of FIG. 1. Reference is also made to FIG. 1. During the session, the user plane may be operative to detect changes in characteristics of the device 28-1 and report events up to the slice amendment function 20 optionally via the session management function 16.

In accordance with one embodiment of the present disclosure, a function applied in the user plane sends the flow data for analysis to the slice amendment function 20. The slice amendment function 20 is operative to receive (block 42) the flow data for analysis and use the received flow data to determine (block 44) at least an additional characteristic of the device 28-1. In accordance with another embodiment of the present disclosure, a function applied in the user plane analyzes the flow data to determine the additional characteristic(s) and sends the additional characteristic(s) to the slice amendment function 20, which is operative to receive (block 46) the additional characteristic(s) of the device 28-1.

The additional characteristic(s) of the device 28-1 may be determined based on applying flow-based analysis to data flowing to, or flowing from, the device 28-1. The flow-based analysis may include applying a flow-based behavior analysis to the data flowing to, or flowing from, the device 28-1. The flow-based analysis may include identifying a browser type from analysis of the data flowing to, or flowing from, the device 28-1. The additional characteristic(s) of the device 28-1 may include any of the following, by way of example only: at least one patch installed on the device 28-1; an upgraded operating system of the device 28-1; whether or not the device 28-1 is currently tethered; and/or whether a device wirelessly connected to the device 28-1 is utilizing the session.

The slice amendment function 20 is operative to determine (block 48): (a) security services that are now needed to counter security risks associated with the additional characteristic(s); and/or (b) security services that are now redundant based on the additional characteristic(s). The slice amendment function 20 may add one or more services and/or remove one or more services from the selected network slice or replace the selected network slice with a new network slice as described in more detail below (block 50).

During the session (i.e. after the initial network slice has already been selected), based on a determination of the additional characteristic(s) of the device 28-1, the slice amendment function 20 is operative to: add at least one new service to, and/or remove at least one service from, the security services included in the selected network slice, based on a security risk change associated with the additional characteristic(s) of the device 28-1; or select a new network slice to replace the selected network slice. The new network slice includes a different list of security services countering security risks associated with the characteristic(s) as amended by, and/or augmented by, the additional characteristic(s) of the device 28-1.

The slice amendment function 20 may be subdivided into two or more sub-functions, for example, one function to analyze which services to add or remove and one function to orchestrate amending or replacing the current network slice. The slice amendment function 20 may run on one or more of the processors 22. The processor 22 running the slice amendment function 20 may be the same processor 22 that runs the slice selection function 18 or may be a different one of the processors 22.

Several examples follow, illustrating how a change in characteristics of the device 28-1 during a session alters the security risks and corresponding security functions to counter the security risks.

By way of a first example, assuming that the device type and operating system of the device 28-1 were not deemed to be susceptible to security risks on session establishment, but during a session, a tethered or WIFI-connected device (e.g. the devices 30) makes use of the session adding certain security risks (e.g. malware). This use might be detected by inline fingerprinting approaches, or from offline analysis of flow records looking at behaviors, browser type etc. The slice amendment function 20 may add inline malware protection to the selected slice and/or may enable IDS/IPS capabilities to prevent device-launched attacks from the connected device. Alternatively, the session could be relocated to a new user plane function (UPF) with the additional security services to counter the newly discovered risks. Session relocation could be a proactive action or performed at the next opportunity resulting from other triggers resulting in a new choice of UPF. For example, a move to a new edge device during the session may result in a change of network slice and that opportunity may be used to select a new slice with the additional security services.

By way of a second example, an upgraded operating system and/or applied patches may be detected during the session, for example, based on behavior fingerprinting. This could allow the release of some threat-focused resources based on the reduced likelihood of device compromise following the upgrade(s). It may also be possible to identify when a device software upgrade has been requested. Behavior fingerprinting could be enabled to analyze flows, to and from the device 28-1, based on the software update request.

In practice, some or all of the functions of the processor 22 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A system for providing security protection in a communication network against various security risks through selection of one or more network slices comprising:
   an interface to receive a device identifier which uniquely identifies a first device in the communication network; and
   a processor to:
      determine at least one characteristic of the first device from the device identifier;
      determine one or more security risks associated with the at least one characteristic of the first device by accessing a first database that links device characteristics with one or more security risks;
      select one or more security services which counter the determined one or more security risks associated with the at least one characteristic of the first device by accessing a second database that links security risks to one or more security services which counter the security risks;
      select at least one network slice in the communication network that includes the selected one or more security services;
      send slice identifier information for the selected at least one network slice to the first device using the interface;
      apply network services included in the selected at least one network slice to a user plane and establish a network session for the first device;
      during the network session, apply flow-based analysis of data flowing to, or flowing from, the first device to identify at least one potential additional security risk due to at least one additional characteristic of the first device;
      in response to the identification of the at least one potential additional security risk, amend the selected at least one network slice by adding or removing or altering one or more security services from the one or more security services in the selected at least one network slice; and
      relocate the network session to a new user plane with the amended at least one network slice.

2. The system according to claim 1, wherein the processor is operative to select the at least one network slice based on a direct mapping between the at least one characteristic of the first device and available network slices.

3. The system according to claim 1, wherein the processor is operative to send a list of allowed network slice selection assistance information to the first device; and
   wherein the slice identifier information about the selected at least one network slice is included in the list of allowed network slice selection assistance information.

4. The system according to claim 1, wherein the device identifier is an International Mobile Equipment Identity (IMEI).

5. The system according to claim 1, wherein the at least one characteristic of the first device includes any of the following: a make of the first device; a model identifier of the first device; a marketing name of the first device; an operating system installed on the first device; a platform of the first device; a version of the operating system or the platform of the first device; a software upgrade installed on the first device; whether wireless local area network connectivity is supported by the first device; which frequency band or bands are supported by the first device; whether Bluetooth wireless technology is supported by the first device; whether dual connectivity is supported by the first device; or whether inter carrier aggregation is supported by the first device.

6. The system according to claim 1, wherein, during the network session, after the selected at least one network slice has already been selected, based on the determination of the at least one additional characteristic of the first device, the processor is further operative to:
   select a new network slice to replace the selected at least one network slice, the new network slice including a second plurality of security services countering security risks associated with the at least one characteristic as amended by, or augmented by, the at least one additional characteristic of the first device.

7. The system according to claim 6, wherein the at least one additional characteristic of the first device is determined based on applying the flow-based analysis to data flowing to, or flowing from, the first device.

8. The system according to claim 7, wherein the flow-based analysis includes applying a flow-based behavior analysis to the data flowing to, or flowing from, the first device.

9. The system according to claim 8, wherein the flow-based behavior analysis includes identifying a browser type from analysis of the data flowing to, or flowing from, the first device.

10. The system according to claim 1, wherein the at least one additional characteristic of the first device includes any of the following: at least one patch installed on the first device; an upgraded operating system of the first device; whether or not the first device is tethered; or whether a device wirelessly connected to the first device is utilizing the network session.

11. A method for providing security protection in a communication network against various security risks through selection of one or more network slices comprising:
   receiving a device identifier which uniquely identifies a first device in the communication network;
   determining at least one characteristic of the first device from the device identifier;
   determining one or more security risks associated with the at least one characteristic of the first device by accessing a first database that links device characteristics with one or more security risks;
   selecting one or more security services which counter the determined one or more security risks associated with the at least one characteristic of the first device by accessing a second database that links security risks to one or more security services which counter the security risks;
   selecting at least one network slice in the communication network that includes the selected one or more security services;

sending slice identifier information for the selected at least one network slice to the first device using the interface;

applying network services included in the selected at least one network slice to a user plane and establish a network session for the first device;

during the network session, applying flow-based analysis of data flowing to, or flowing from, the first device to identify at least one potential additional security risk due to at least one additional characteristic of the first device;

in response to the identification of the at least one potential additional security risk, amending the selected at least one network slice by adding or removing or altering one or more security services from the one or more security services in the selected at least one network slice; and relocating the network session to a new user plane with the amended at least one network slice.

12. The method according to claim 11, further comprising selecting the at least one network slice based on a direct mapping between the at least one characteristic of the first device and available network slices.

13. The method according to claim 11, further comprising:

sending a list of allowed network slice selection assistance information to the first device; and wherein the slice identifier information about the selected at least one network slice is included in the list of allowed network slice selection assistance information.

14. The method according to claim 11, wherein the device identifier is an International Mobile Equipment Identity (IMEI).

15. The method according to claim 11, wherein the at least one characteristic of the first device includes any of the following: a make of the first device; a model identifier of the first device; a marketing name of the first device; an operating system installed on the first device; a platform of the first device; a version of the operating system or the platform of the first device; a software upgrade installed on the first device; whether wireless local area network connectivity is supported by the first device; which frequency band or bands are supported by the first device; whether Bluetooth wireless technology is supported by the first device; whether dual connectivity is supported by the first device; or whether inter carrier aggregation is supported by the first device.

16. The method according to claim 11, further comprising, during the network session, after the at least one network slice has already been selected, based on the determination of the at least one additional characteristic of the first device:

selecting a new network slice to replace the selected at least one network slice, the new network slice including a second plurality of security services countering security risks associated with the at least one characteristic as amended by, or augmented by, the at least one additional characteristic of the first device.

17. The method according to claim 16, wherein the at least one additional characteristic of the first device is determined based on applying the flow-based analysis to data flowing to, or flowing from, the first device.

18. The method according to claim 17, wherein the flow-based analysis includes applying a flow-based behavior analysis to the data flowing to, or flowing from, the first device.

19. The method according to claim 18, wherein the flow-based analysis includes identifying a browser type from analysis of the data flowing to, or flowing from, the first device.

20. The method according to claim 11, wherein the at least one additional characteristic of the first device includes any of the following: at least one patch installed on the first device; an upgraded operating system of the first device; whether or not the first device is tethered; or whether a device wirelessly connected to the first device is utilizing the network session.

* * * * *